(12) United States Patent
Preisler et al.

(10) Patent No.: US 8,852,711 B2
(45) Date of Patent: *Oct. 7, 2014

(54) CARPETED, VEHICLE LOAD FLOOR INCLUDING A PIVOTABLE COVER SEGMENTED INTO ARTICULATED, SECTIONAL MEMBERS

(75) Inventors: Darius J. Preisler, Macomb, MI (US); Christopher A. Heikkila, Washington Township, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 223 days.

This patent is subject to a terminal disclaimer.

(21) Appl. No.: 13/523,253

(22) Filed: Jun. 14, 2012

(65) Prior Publication Data

US 2013/0278009 A1 Oct. 24, 2013

Related U.S. Application Data

(63) Continuation-in-part of application No. 13/453,201, filed on Apr. 23, 2012, now Pat. No. 8,690,233, and a continuation-in-part of application No. 13/453,269, filed on Apr. 23, 2012.

(51) Int. Cl.
*B62D 25/20* (2006.01)
(52) U.S. Cl.
USPC .......... 428/99; 296/39.1; 296/39.2; 296/39.3; 296/97.23; 428/95; 428/98; 428/116
(58) Field of Classification Search
CPC .......... A47G 27/02; B29C 43/00; B32B 3/02; B32B 3/04; B32B 3/12; B32B 3/263; B60R 5/00; B60R 5/04; B60R 13/00; B60R 13/011; B62D 25/20

USPC .............. 428/99, 95, 98, 116; 296/39.1, 39.2, 296/39.3, 97.23
See application file for complete search history.

(56) References Cited

U.S. PATENT DOCUMENTS

| | | | |
|---|---|---|---|
| 5,298,694 A | 3/1994 | Thompson et al. |
| 5,502,930 A | 4/1996 | Burkette et al. |
| 5,915,445 A | 6/1999 | Rauenbusch |
| 5,979,962 A | 11/1999 | Balentin et al. |

(Continued)

OTHER PUBLICATIONS

Office Action; related U.S. Appl. No. 13/479,974; date of mailing Mar. 20, 2014.

(Continued)

*Primary Examiner* — Brent O'Hern
(74) *Attorney, Agent, or Firm* — Brooks Kushman P.C.

(57) ABSTRACT

A carpeted, vehicle load floor including a pivotable, carpeted cover segmented into articulated sectional members is provided. The load floor includes a compression-molded composite panel and the segmented cover to removably cover a storage area in the interior of the vehicle. The cover is segmented into articulated, planar sectional members to allow desired cover positioning over the storage area. The members are pivotally connected to one another for folding one over the other. The load floor also includes a substantially continuous carpet layer bonded to a top support surface of the panel and top support surfaces of each of the members. A first living hinge allows the carpeted cover to pivot between different use positions and a second living hinge allows the members to easily pivot and fold one over the other in a compact, folded, open position of the cover.

20 Claims, 4 Drawing Sheets

(56) References Cited

U.S. PATENT DOCUMENTS

| | | | |
|---|---|---|---|
| 6,050,630 A | 4/2000 | Hochet | |
| 6,102,464 A | 8/2000 | Schneider et al. | |
| 6,435,577 B1 | 8/2002 | Renault | |
| 6,537,413 B1 | 3/2003 | Hochet et al. | |
| 6,631,785 B2 | 10/2003 | Khambete et al. | |
| 6,655,299 B2 | 12/2003 | Preisler et al. | |
| 6,659,223 B2 | 12/2003 | Allison et al. | |
| 6,682,675 B1 | 1/2004 | Vandangeot et al. | |
| 6,682,676 B1 | 1/2004 | Renault et al. | |
| 6,720,058 B1 | 4/2004 | Weeks et al. | |
| 6,748,876 B2 | 6/2004 | Preisler et al. | |
| 6,790,026 B2 | 9/2004 | Vandangeot et al. | |
| 6,793,747 B2 | 9/2004 | North et al. | |
| 6,823,803 B2 | 11/2004 | Preisler | |
| 6,843,525 B2 | 1/2005 | Preisler | |
| 6,890,023 B2 | 5/2005 | Preisler et al. | |
| 6,918,625 B2 | 7/2005 | Storto et al. | |
| 6,926,348 B2 | 8/2005 | Krueger et al. | |
| 6,945,594 B1 | 9/2005 | Bejin et al. | |
| 6,981,863 B2 | 1/2006 | Renault et al. | |
| 7,014,259 B2 | 3/2006 | Heholt | |
| 7,059,646 B1 | 6/2006 | DeLong et al. | |
| 7,090,274 B1 | 8/2006 | Khan et al. | |
| 7,093,879 B2 | 8/2006 | Putt et al. | |
| 7,264,685 B2 | 9/2007 | Katz et al. | |
| 7,320,739 B2 | 1/2008 | Thompson, Jr. et al. | |
| 7,399,515 B1 | 7/2008 | Thele | |
| 7,402,537 B1 | 7/2008 | Lenda et al. | |
| 7,419,713 B2 | 9/2008 | Wilkens et al. | |
| 7,628,440 B2 | 12/2009 | Bernhardsson et al. | |
| 7,837,009 B2 | 11/2010 | Gross et al. | |
| 7,909,379 B2 | 3/2011 | Winget et al. | |
| 7,918,313 B2 | 4/2011 | Gross et al. | |
| 7,919,031 B2 | 4/2011 | Winget et al. | |
| 8,117,972 B2 | 2/2012 | Winget et al. | |
| 8,622,456 B2* | 1/2014 | Preisler et al. | 296/39.3 |
| 8,690,233 B2 | 4/2014 | Preisler et al. | |
| 2004/0037995 A1 | 2/2004 | Nicolai et al. | |
| 2005/0189674 A1 | 9/2005 | Hochet et al. | |
| 2006/0255611 A1 | 11/2006 | Smith et al. | |
| 2008/0145635 A1 | 6/2008 | Stoll et al. | |
| 2008/0185866 A1 | 8/2008 | Tarrant et al. | |
| 2010/0026031 A1 | 2/2010 | Jouraku | |
| 2010/0060038 A1 | 3/2010 | Takakura et al. | |
| 2011/0315310 A1 | 12/2011 | Trevisan et al. | |
| 2013/0278002 A1 | 10/2013 | Preisler et al. | |
| 2013/0278003 A1 | 10/2013 | Preisler et al. | |
| 2013/0278007 A1* | 10/2013 | Preisler et al. | 296/97.23 |
| 2013/0278008 A1* | 10/2013 | Preisler et al. | 296/97.23 |
| 2013/0278009 A1* | 10/2013 | Preisler et al. | 296/97.23 |
| 2013/0278015 A1 | 10/2013 | Preisler et al. | |
| 2013/0278018 A1 | 10/2013 | Preisler et al. | |
| 2013/0278019 A1 | 10/2013 | Preisler et al. | |
| 2013/0278020 A1 | 10/2013 | Preisler et al. | |
| 2013/0280469 A1 | 10/2013 | Preisler et al. | |
| 2013/0280472 A1* | 10/2013 | Preisler et al. | 428/95 |
| 2013/0280473 A1 | 10/2013 | Preisler et al. | |
| 2013/0312652 A1 | 11/2013 | Preisler et al. | |
| 2013/0316123 A1 | 11/2013 | Preisler et al. | |
| 2014/0077518 A1 | 3/2014 | Preisler et al. | |
| 2014/0077530 A1 | 3/2014 | Preisler et al. | |
| 2014/0077531 A1 | 3/2014 | Preisler et al. | |
| 2014/0145465 A1 | 5/2014 | Preisler et al. | |
| 2014/0145470 A1 | 5/2014 | Preisler et al. | |
| 2014/0147617 A1 | 5/2014 | Preisler et al. | |
| 2014/0147622 A1 | 5/2014 | Preisler et al. | |

OTHER PUBLICATIONS

Office Action; related U.S. Appl. No. 13/686,362; date of mailing Mar. 25, 2014.
Office Action; related U.S. Appl. No. 13/523,253; date of mailing Mar. 25, 2014.
Office Action; related U.S. Appl. No. 13/688,972; date of mailing Mar. 28, 2014.
Office Action; related U.S. Appl. No. 13/687,232; date of mailing Mar. 28, 2014.
Office Action; related U.S. Appl. No. 13/689,809; date of mailing Mar. 31, 2014.
Office Action; related U.S. Appl. No. 13/687,213; date of mailing Mar. 31, 2014.
Office Action; related U.S. Appl. No. 13/690,265; date of mailing Mar. 31, 2014.
Office Action; related U.S. Appl. No. 13/762,904; date of mailing Apr. 8, 2014.
Office Action; related U.S. Appl. No. 13/762,800; date of mailing Apr. 8, 2014.
Office Action; related U.S. Appl. No. 13/762,861; date of mailing Apr. 9, 2014.
Office Action; related U.S. Appl. No. 13/690,566; date of mailing Apr. 9, 2014.
Office Action; related U.S. Appl. No. 13/762,832; date of mailing Apr. 11, 2014.
Office Action; related U.S. Appl. No. 13/762,921; date of mailing Apr. 14, 2014.
Notice of Allowance; related U.S. Appl. No. 13/686,388; date of mailing Apr. 15, 2014.
Related U.S. Appl. No. 13/690,566, filed Nov. 30, 2012.
Related U.S. Appl. No. 13/762,921, filed Feb. 8, 2013.
Related U.S. Appl. No. 13/762,956, filed Feb. 8, 2013.
Office Action; related U.S. Appl. No. 13/453,201 (now USPN 8,690,233); date of mailing Nov. 20, 2013.
Office Action; related U.S. Appl. No. 13/523,209 (now USPN 8,622,456) date of mailing Apr. 29, 2013.

* cited by examiner

CARPETED, VEHICLE LOAD FLOOR INCLUDING A PIVOTABLE COVER SEGMENTED INTO ARTICULATED, SECTIONAL MEMBERS

CROSS-REFERENCE TO RELATED APPLICATIONS

This application is a continuation-in-part of both U.S. patent application entitled "Carpeted Automotive Vehicle Load Floor Having a Living Hinge" filed Apr. 23, 2012 and having U.S. Ser. No. 13/453,201 and U.S. patent application entitled "Method of Making a Sandwich-Type Composite Panel Having a Living Hinge and Panel Obtained by Performing the Method" also filed Apr. 23, 2012 and having U.S. Ser. No. 13/453,269, both of which are incorporated by reference herein in their entirety.

TECHNICAL FIELD

This invention relates, in general, to the field of vehicle load floors and, in particular, to such load floors which are carpeted and have pivotable, segmented covers.

Overview

Sandwich-type composite panels including cores have very important characteristics because of their light weight and high strength. Conventionally, such panels are constructed by sandwiching a core having a large number of cavities and having low strength characteristics between two outer layers or skins, each of which is much thinner than the core but has excellent mechanical characteristics.

The prior art discloses a method of making a panel of sandwich-type composite structure having a cellular core in a single processing step. In that method, the panel is made by subjecting a stack of layers of material to cold-pressing in a mold. As shown in FIG. 1, the stack is made up of: at least a first skin made of a reinforced thermoplastics material, a cellular core made of a thermoplastics material, and a second skin also made of a reinforced thermoplastics material. The stack may also include one or more external covering layers made of a woven or nonwoven thermoplastic material. The skins may be pre-heated outside the mold or heated inside the mold to a softening temperature.

Such a method is particularly advantageous because of the fact that it makes it possible, in a single operation, to generate cohesion and bonding between the various layers of the composite structure as shown in FIG. 2, and to shape the resulting panel while preserving all of the mechanical properties imparted by the cellular-core, sandwich structure.

Panels of sandwich-type composite structure having a cellular core have rigidity characteristics sufficient to enable mechanical structures subjected to large stresses to be reinforced structurally without making them too heavy. Such panels are in common use in shipbuilding, aircraft construction, and rail vehicle construction.

To maximize the functionality of such panels, it is known, in particular, that hinges can be added so that the panels can be hinged to other panels. Such hinges typically are separate parts that are fixed to the panels by gluing, welding, riveting, or some other fastening technique.

Such hinges are fixed to the sandwich-structure composite panels in a separate and subsequent operation, after said panels have been formed. That subsequent operation requires an additional workstation, be it automated or otherwise, which increases, in particular, the manufacturing time and cost of the finished parts.

In addition, the fact that separate, external parts are mounted on a composite panel of the sandwich-type is a source of quality defects, and thus adds to the cost of making such panels.

Published U.S. Patent Application 2005/0189674 discloses a method of making a composite panel of sandwich structure provided with a hinge. The panel includes a stack made up of a first skin of a reinforced thermoplastics material, a cellular core made of a thermoplastics material, and a second skin made of a reinforced thermoplastics material. The panel is formed by pressing the stack in a mold. The first and second skins are preheated to a softening temperature. As shown in FIGS. 3 and 4, after the panel has formed, an incision is made at a determined place in the panel so as to cut through one of the first and second skins, and substantially through the entire thickness of the cellular core, while leaving the other skin intact so that it forms a living hinge between two portions of the incised panel.

Other U.S. patent documents related to the present invention include: U.S. Pat. Nos. 5,298,694; 5,502,930; 5,915,445; 5,979,962; 6,050,630; 6,102,464; 6,435,577; 6,537,413; 6,631,785; 6,655,299; 6,659,223; 6,682,675; 6,793,747; 6,748,876; 6,790,026; 6,682,676; 6,823,803; 6,823,803; 6,843,525; 6,890,023; 6,981,863; 7,014,259; 7,090,274; 7,093,879; 7,264,685; 7,320,739; 7,402,537; 7,419,713; 7,837,009; 7,909,379; 7,918,313; 7,919,031; 8,117,972; 2006/0255611; 2008/0185866 and 2011/0315310.

One problem associated with prior art load floors in the automotive industry is that the load floors typically require many assembly steps often involving costly labor. Also, some of the materials making up such load floors are often non-recyclable.

A problem associated with carpeted load floors having pivotable covers which cover a storage area in an automotive vehicle is that the storage area can be quite extensive, thereby requiring the cover to sweep out a large volume to allow one to access all portions of the storage area. Also, such covers strike or catch on objects at the rear interior of the vehicle.

To solve this problem, some load floors have covers which are articulated with metal hinges. However, such articulated covers are often unsightly, heavy and are difficult and unwieldly to open with a single hand.

SUMMARY OF EXAMPLE EMBODIMENTS

An object of at least one embodiment of the present invention is to provide a carpeted vehicle load floor including a pivotable, segmented cover which is light-weight, completely covers a relatively large interior storage area of the vehicle and which collapses or folds into a compact configuration.

In carrying out the above object and other objects of at least one embodiment of the present invention, a carpeted, vehicle load floor including a pivotable cover segmented into articulated, sectional members is provided. The load floor includes a compression-molded, planar, composite panel including first and second outer layers. A core is positioned between the outer layers and has a large number of cavities. The outer layers are bonded to the core by press molding. The first outer layer has a top support surface. The load floor also includes a segmented cover to removably cover at least one storage area in the interior of the vehicle. The cover is segmented into articulated, planar, sectional members to allow desired cover positioning over the at least one storage area. The cover is pivotally connected to the composite panel. The sectional members are pivotally connected to one another for folding one of the members over the other one of the members. Each member has a top support surface. The load floor further includes a substantially continuous carpet layer bonded to the top support surface of the panel and the top support surface of each of the members to at least partially form a carpeted load floor having a carpeted cover. The load floor finally includes a first living hinge which allows the carpeted cover to pivot between different use positions including open and closed positions relative to the rest of the load floor and a second living hinge which allows the members to pivot and fold one over the other in a folded, open position of the cover.

The first living hinge may include a portion of the carpet layer not bonded to the panel or either of the segments.

Portions of the carpet layer not bonded to the cover at least partially form the living hinges. The second living hinge may be a two-way living hinge. The second living hinge may include a portion of the carpet layer not bonded to either of the members. Each of the living hinges may include a portion of the carpet layer not bonded to the panel or either of the members.

A portion of the composite panel may have a reduced thickness to form a depression which receives the carpeted cover in at least one of the use positions wherein thickness of the carpeted cover is substantially equal to depth of the depression.

The cover-receiving depression may receive the carpeted cover in two use positions wherein the cover extends from the first living hinge in opposite directions in the two use positions.

The cover may be a thermoplastic cover.

The carpet layer may be a thermoplastic carpet layer wherein the thermoplastic of the cover and the carpet layer is polypropylene.

The composite panel may have a thickness in the range of 5 to 25 mm.

The carpet layer may be a thermoplastic carpet layer having thermoplastic fibers. One of the members may include a compression-molded, composite panel including third and fourth outer layers and a second core having a large number of cavities positioned between the third and fourth outer layers wherein the third and fourth outer layers are bonded to the second core by press molding.

The other one of the members may include a compression-molded, composite panel including fifth and sixth outer layers and a third core having a large number of cavities positioned between the fifth and sixth outer layers wherein the fifth and sixth outer layers are bonded to the third core by press molding.

Further in carrying out the above object and other objects of at least one embodiment of the present invention, a carpeted, vehicle load floor including a pivotable cover, segmented into articulated, sectional members is provided. The load floor includes a compression-molded, planar, composite panel having first and second reinforced thermoplastic skins and a core having a large number of cavities disposed between the skins. The skins are bonded to the core by press molding. The first skin has a top support surface. The load floor also includes a segmented cover to removably cover at least one storage area in the interior of the vehicle. The cover is segmented into articulated, planar, sectional members to allow desired cover positioning over the at least one storage area. The cover is pivotally connected to the composite panel. The sectional members are pivotally connected to one another for folding one of the members over the other one of the members. Each member has a top support surface. The load floor further includes a substantially continuous carpet layer bonded to the top support surface of the panel and the top support surface of each of the members to at least partially form a carpeted load floor having a carpeted cover. The load floor finally includes a first living hinge which allows the carpeted cover to pivot between different use positions including open and closed positions relative to the rest of the load floor, and a second living hinge which allows the members to pivot and fold one over the other in a folded, open position of the cover.

A portion of the carpet layer not bonded to the panel or either of the members may at least partially form the first living hinge.

A portion of the carpet layer not bonded to the panel or either of the members may at least partially form the second living hinge.

Still further in carrying out the above object and other objects of at least one embodiment of the present invention, a carpeted, vehicle load floor including a pivotable cover segmented into articulated, sectional members is provided. The load floor includes a compression-molded, planar, composite panel having first and second reinforced thermoplastic skins and a core having a large number of cavities. The core is disposed between and bonded to the skins by press molding. The first skin has a top support surface. The load floor also includes a segmented, compression-molded, composite cover to removably cover at least one storage area in the interior of the vehicle. The cover is pivotally connected to the composite panel. The cover is segmented into articulated, planar, sectional members to allow desired cover positioning over the at least one storage area. The members are pivotally connected to one another for folding one of the members over the other one of the members. Each member has a top support surface. One of the members includes third and fourth reinforced thermoplastic skins and a core having a large number of cavities and disposed between and bonded to the third and fourth skins by press molding. The load floor further includes a substantially continuous carpet layer bonded to the top support surface of the panel and the top support surface of each of the members to form a carpeted load floor having a carpeted cover. The load floor finally includes a first living hinge which allows the carpeted cover to pivot between different use positions including open and closed positions relative to the rest of the load floor and a second living hinge which allows the members to pivot and fold one over the other in a folded, open position of the cover.

A portion of the carpet layer may at least partially form the first living hinge. A portion of the carpet layer may at least partially form the second living hinge.

Other technical advantages will be readily apparent to one skilled in the art from the following figures, descriptions and claims. Moreover, while specific advantages have been enumerated, various embodiments may include all, some or none of the enumerated advantages.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
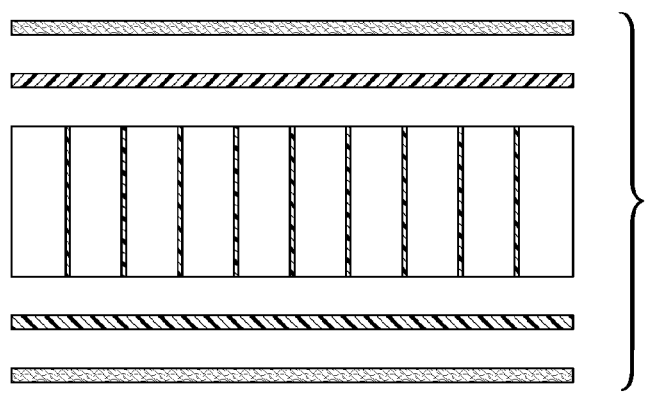
FIG. 1 is a side sectional view showing various separate layers of a prior art stack of thermoplastic-based layers of material.
Figure 2:
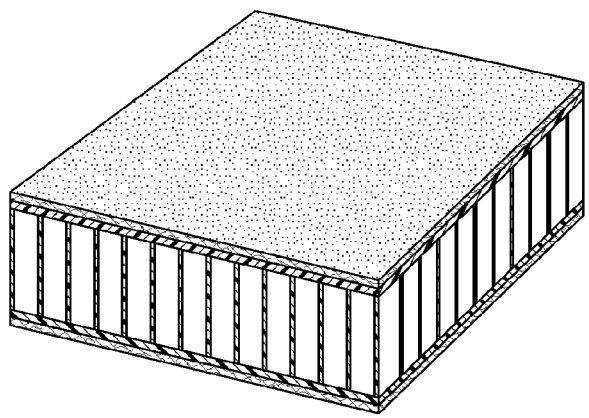
FIG. 2 is a top perspective sectional view of the stack of FIG. 1 after compression molding.
Figure 3:
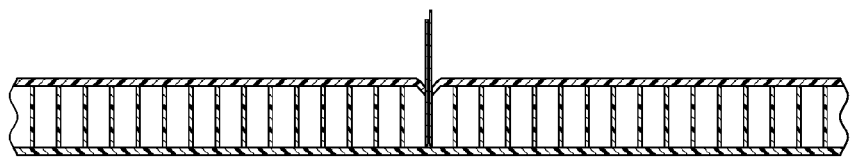
FIGS. 3 and 4 are side views, partially broken away and in cross section, of a prior art sandwich-type composite panel having a living hinge and method of making the living hinge.
Figure 4:
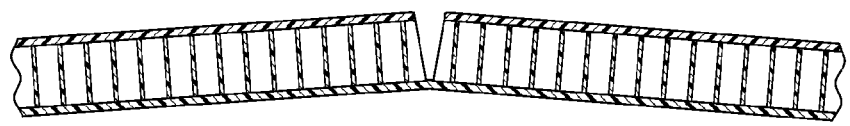
Figure 5:
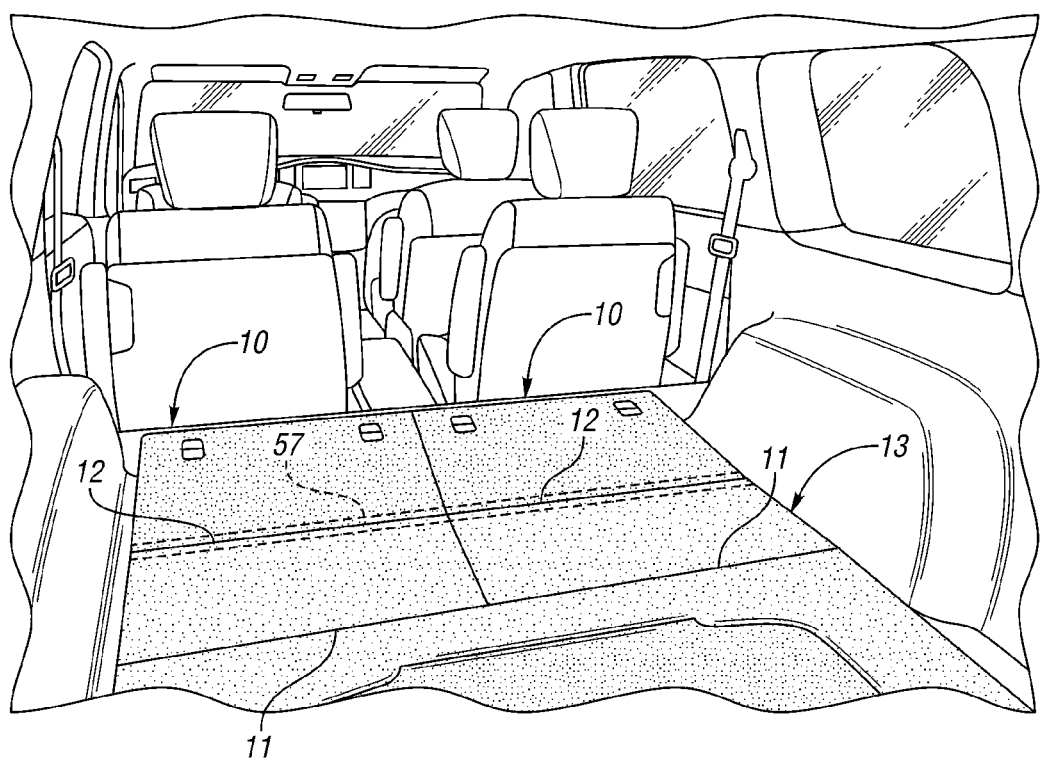
FIG. 5 is an environmental view, partially broken away, of a carpeted automotive vehicle load floor including a pair of carpeted, sandwich-type, compression-molded, composite panels each having a pivotable carpeted cover segmented into articulated, sectional members constructed in accordance with at least one embodiment of the present invention.
Figure 6:
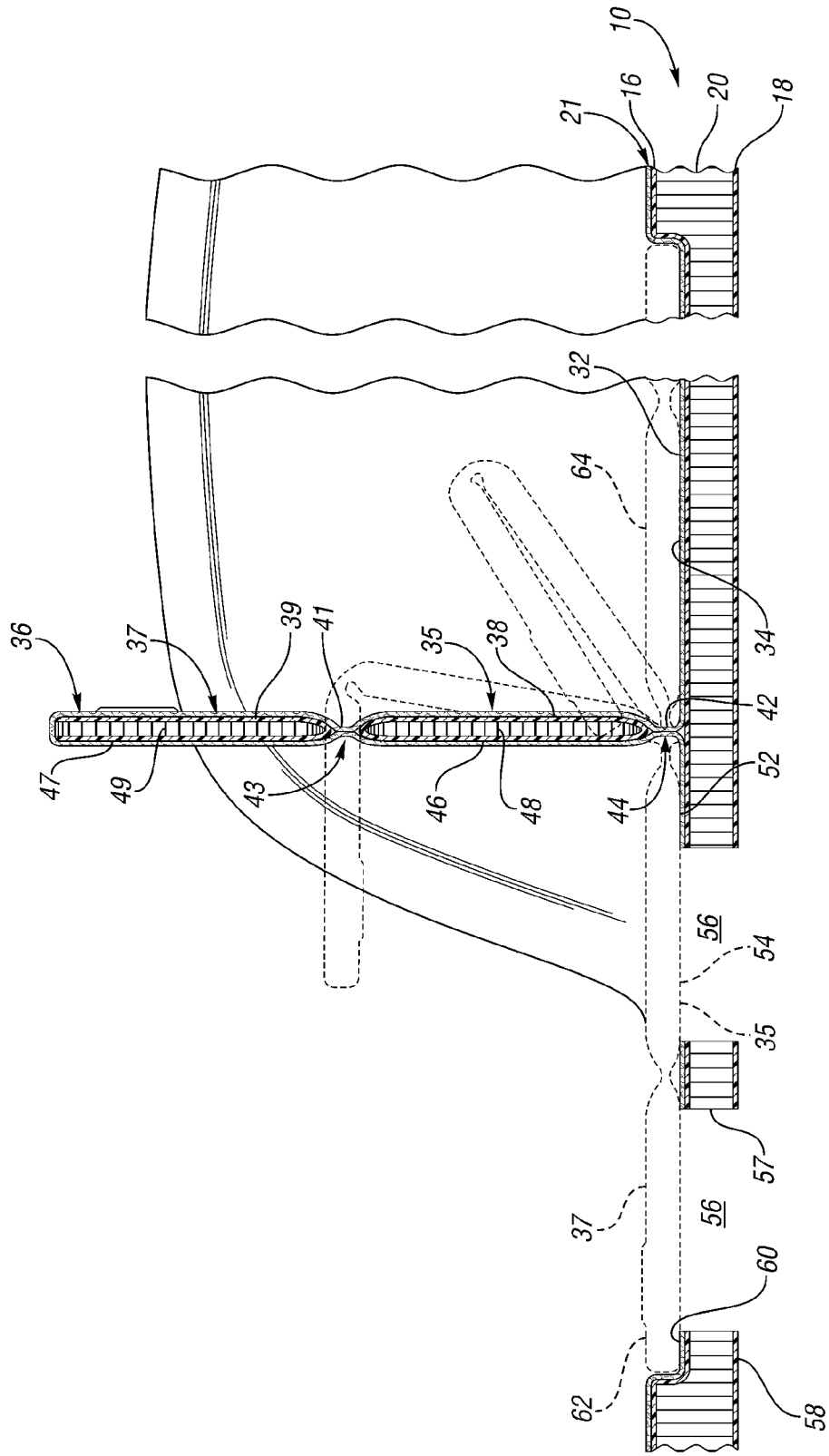
FIG. 6 is a side view, partially broken away and in cross section, of one of the panels of FIG. 5 with its carpeted cover shown in multiple different use positions, one of which is a fan fold position shown by phantom lines.
Figure 7:
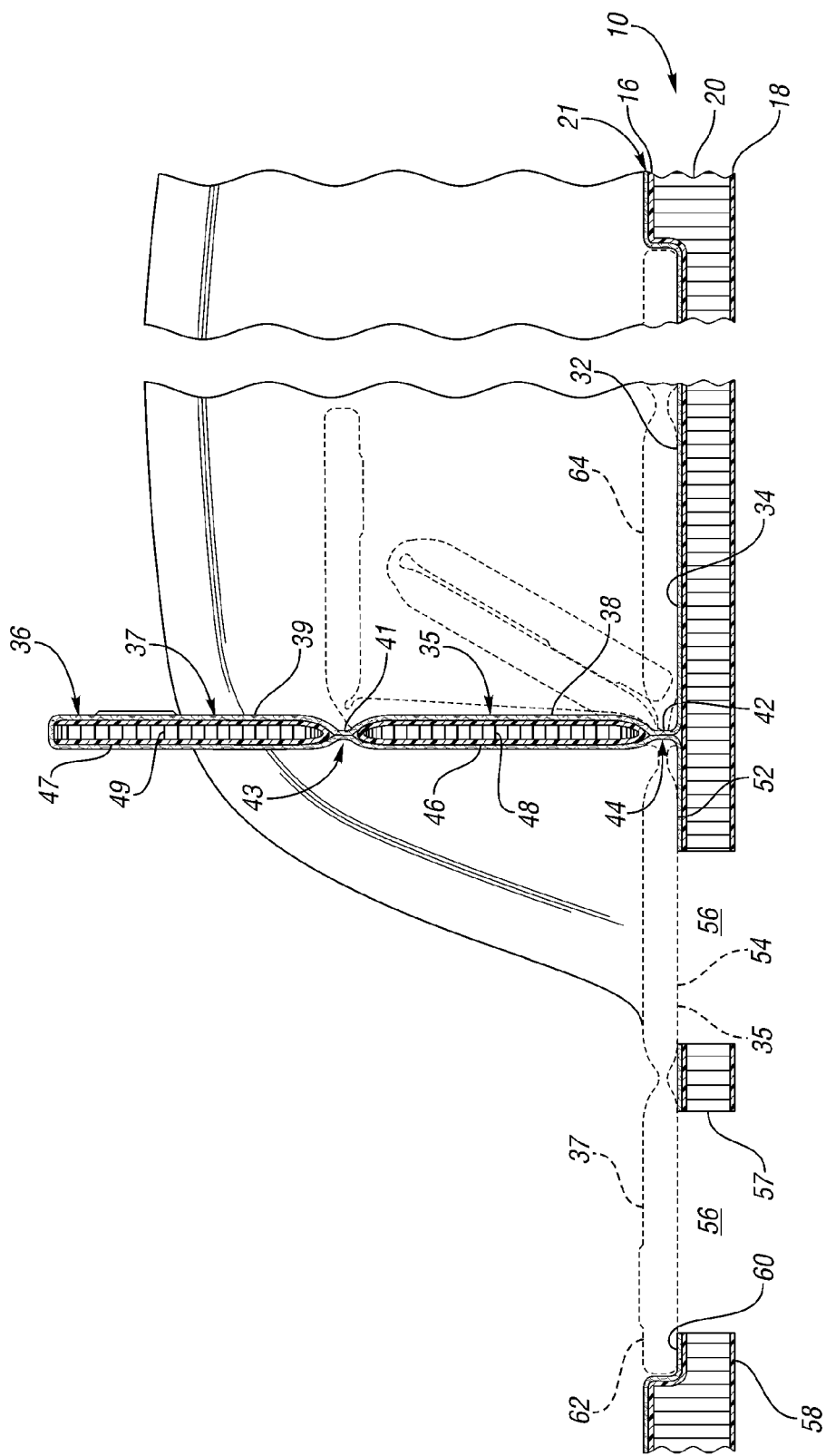
FIG. 7 is a view, similar to the view of FIG. 6, showing a roll fold position of the articulated, sectional members.

Referring now to the FIGS. 5, 6, and 7, different embodiments of a carpeted automotive vehicle load floor, generally indicated at 13, include a pair of carpeted, compression-molded, sandwich-type, composite hinged panels 10. Each panel 10 has a pair of living hinges 11 and 12 and forms a separate part of the vehicle load floor 13. However, it is to be understood that one or more hinged panels 10 constructed in accordance with at least one embodiment of the present invention may be used in a wide variety of environments besides the automotive vehicle environment of FIG. 5.

Each hinged panel 10 is typically manufactured by providing a stack of material located or positioned within a mold. The stack includes first and second reinforced thermoplastic skins or outer layers 16 and 18, respectively, a core having a large number of cavities such as a thermoplastic cellular core 20 disposed between and bonded to the skins 16 and 18 by press molding. A substantially continuous covering or carpet layer, generally indicated at 21, made of thermoplastics material covers and is bonded to the first skin 16 which provides a top support surface. The skins 16 and 18 are heated typically outside of the mold to a softening temperature. The mold is preferably a low-pressure, compression mold which performs a thermo-compression process on the stack of materials.

A portion 32 of the composite panel 10 is crushed at a predetermined location simultaneously with the step of applying the pressure to compact and reduce the thickness of the cellular core 20 at the predetermined location to form a depression 34 which receives a carpeted, segmented cover, generally indicated at 36, of the load floor 13 at a pair of use positions as indicated by phantom lines in FIG. 6. The thickness of the carpeted cover 36 is substantially equal to the depth of the depression 34. The cover 36 is segmented into articulated, sectional, first and second members, generally indicated at 35 and 37, respectively. The planar sectional members 35 and 37 allow desired cover positioning over one or more storage areas within the interior of the vehicle.

The thermoplastic carpet layer 21 not only covers the first skin 18, but also covers and is bonded to an upper skin 38 of the member 35 to provide an upper support surface. An intermediate portion 42 of the layer 21 is not bonded to either the skin 16 or the skin 38 to at least partially form a first living hinge, generally indicated at 44 (or 11 in FIG. 5). The first living hinge 44 allows the carpeted cover 36 to pivot between the different use positions of FIG. 6.

The thermoplastic layer 21 also covers and is bonded to an upper skin 39 of the member 37 of the cover 36. The skin 39 provides an upper support surface. An intermediate portion 41 of the carpet layer 21 is not bonded to either the skin 38 or the skin 39 to at least partially form a second living hinge, generally indicated at 43. The second living hinge 43 allows the carpeted second member 37 to pivot and fold either over (FIG. 6) or under the (FIG. 7) the carpeted first member 35 in a folded open position of the cover 36.

The carpet layer 21 may be a resin carpet and the resin may be polypropylene. One side or both sides of the cover 36 of the hinged panel 10 may be covered with the carpet layer 21 which may be made of a woven or nonwoven material (typically of the carpet type).

As shown in FIG. 6, the first member 35 of the cover 36 also includes a lower skin 46 and a cellular core 48 disposed between and bonded to the skins 38 and 46. In like fashion, the second member 37 of the cover 36 also includes lower skin 47 and a cellular core 49 disposed between and bonded in the skins 39 and 47.

The cellular core 48 (as well as the cores 20 and 49) may be a honeycomb core. In this example, the cellular cores 48 and 49 and the core 20 have an open-celled structure of the type made up of tubes or a honeycomb, and it is made mainly of polyolefin and preferably of polypropylene. It is also possible to use a cellular structure having closed cells of the foam type. Alternatively, the members 35 and 37 may be made of a different material(s), such as a solid or hollow thermoplastic plastic part, to which the top and bottom layers of the carpet layer 21 are bonded.

Each of the skins 16 and 18 (as well as the skins 38 and 46 and the skins 39 and 47) may be fiber reinforced. The thermoplastic of the skins 16, 18, 38, 39, 47 and 46, the covering layer 21 and the cores 20, 49 and 48 may be polypropylene. At least one of the skins 16, 18, 38, 39, 47 and 46 may be a woven skin, such as polypropylene skin. Each of the skins 16, 18, 38, 39, 47 and 46 may be reinforced with fibers, e.g., glass fibers, carbon fibers or natural fibers. At least one of the skins 16, 18, 38, 39, 47 and 46 may advantageously be made up of woven glass fiber fabric and of a thermoplastics material.

Each resulting hinged panel 10 may have a thickness in the range of 5 to 25 mm and the crushed portion of the panel 10 may have a thickness in the range of 3 to 15 mm. The depression 34 may have a depth in the range of 2 to 10 mm.

In one example method of making the hinged panel 10 including the cover 36, stacks of material may be pressed in a low pressure, cold-forming mold 22. With respect to a first part of the hinged panel 10, the stack is made up of the first skin 16, the cellular core 20, the second skin 18 and a portion of the covering layer 21, and is pressed at a pressure lying in the range of $10 \times 10^5$ Pa. to $30 \times 10^5$ Pa. The first and second skins 16 and 18 are preferably pre-heated to make them malleable and stretchable. Advantageously, in order to soften the first and second skins 16 and 18, respectively, heat is applied to a pre-assembly constituted by the stack made up of at least the first skin 16, of the cellular core 20, and the second skin 18 so that, while the first part of the panel 10 is being formed in the mold, the first and second skins 16 and 18 have a forming temperature lying approximately in the range of 160° C. to 200° C., and, in this example, about 180° C. In like fashion, the cover 36 including the first and second sectional members 35 and 37 may be formed. However, in forming the cover 36, the second living hinge 43 may be formed by performing the method of the above-noted patent application entitled "Method of Making a Sandwich Type Composite Panel Having a Living Hinge and Panel Obtained by Performing the Method."

An end portion 52 of the bottom layer of the layer 21 is also bonded to the top surface of the skin 16 and helps to support the carpeted cover 36 in one of the use positions of the cover 36, as indicated in phantom at 54 in FIG. 6. In the position 54, the cover 36 encloses a pair of storage areas 56 (separated by a composite plastic support 57) located between the panel 10 and another composite panel 58 having a depression 60 to receive a free end portion 62 of the second sectional member 37 of the cover 36. The panel 58 may also be a carpeted, composite panel similar in construction to the panel 10 having the hinged cover 36.

In another use position, indicated at 64 by phantom lines, the segmented, folded cover 36 is received within the depression 34 to allow access to the storage area 56 without having to hold the cover 36 open as indicated by the solid line position of the cover 36 in FIGS. 6 and 7.

The covering layer 21 including its top and bottom layers is substantially continuous and may be formed from separate pieces of thermoplastic resin carpet which are subsequently bonded or fused together, such as by heat and/or pressure to carpet the entire top support surface of the hinged panel 10 as well as the bottom surface of the hinged cover 36.

FIGS. 6 and 7 show first and second embodiments of a carpeted, sandwich-type, composite hinged cover 36, respectively. Each of the members 35 and 37 has the same structure and function in the two embodiments except in the first embodiment of FIG. 6 the second member 37 is folded over the first member 35 rather than under the first member 35 as shown in FIGS. 6 and 7.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A carpeted, vehicle load floor including a pivotable cover segmented into articulated, sectional members, the load floor comprising
    a compression-molded, planar, composite panel including a first outer layer and second outer layer and a core positioned between the outer layers and having a plurality of cavities wherein the outer layers are bonded to the core by press molding, the first outer layer having a top support surface;
    a segmented cover to removably cover at least one storage area in the interior of the vehicle, the cover being segmented into articulated, planar, sectional members to allow desired cover positioning over the at least one storage area, the cover being pivotally connected to the composite panel, the sectional members being pivotally connected to one another for folding one of the members over the other one of the members, each member having a top support surface;
    a substantially continuous carpet layer bonded to the top support surface of the panel and the top support surface of each of the members to at least partially form a carpeted load floor having a carpeted cover;
    a first living hinge which allows the carpeted cover to pivot between different use positions including open and closed positions relative to the rest of the load floor; and
    a second living hinge which allows the members to pivot and fold one over the other in a folded, open position of the cover.

2. The load floor as claimed in claim 1, wherein the first living hinge includes a portion of the carpet layer not bonded to the panel or either of the segments.

3. The load floor as claimed in claim 1, wherein portions of the carpet layer not bonded to the cover at least partially form the living hinge.

4. The load floor as claimed in claim 1, wherein the second living hinge is a two-way living hinge.

5. The load floor as claimed in claim 1, wherein the second living hinge includes a portion of the carpet layer not bonded to either of the members.

6. The load floor as claimed in claim 1, wherein each of the living hinges includes a portion of the carpet layer not bonded to the panel or either of the members.

7. The load floor as claimed in claim 1, wherein a portion of the composite panel has a reduced thickness to form a depression which receives the carpeted cover in at least one of the use positions and wherein thickness of the carpeted panel is substantially equal to depth of the depression.

8. The load floor as claimed in claim 7, wherein the cover-receiving depression receives the carpeted cover in two use positions and wherein the cover extends from the first living hinge in opposite directions in the two use positions.

9. The load floor as claimed in claim 1, wherein the cover is a thermoplastic cover.

10. The load floor as claimed in claim 9, wherein the carpet layer is a thermoplastic carpet layer and wherein the thermoplastic of the cover and the carpet layer is polypropylene.

11. The load floor as claimed in claim 1, wherein the composite panel has a thickness in the range of 5 to 25 mm.

12. The load floor as claimed in claim 1, wherein the carpet layer is a thermoplastic carpet layer having thermoplastic fibers.

13. The load floor as claimed in claim 1, wherein the first member comprises a compression-molded, composite panel including third and fourth outer layers and a second core having a plurality of cavities positioned between the third and fourth outer layers and wherein the third and fourth outer layers are bonded to the second core by press molding.

14. The load floor as claimed in claim 13, wherein the second member comprises a compression-molded, composite panel including fifth and sixth outer layers and a third core having a plurality of cavities positioned between the fifth and sixth outer layers and wherein the fifth and sixth outer layers are bonded to the third core by press molding.

15. A carpeted, vehicle load floor including a pivotable cover segmented into articulated, sectional members, the load floor comprising:
    a compression-molded, planar, composite panel having a reinforced plastic first skin and a reinforced plastic second skin and a core having a plurality of cavities disposed between the skins, the skins being bonded to the core by press molding, the first skin having a top support surface;
    a segmented cover to removably cover at least one storage area in the interior of the vehicle, the cover being segmented into articulated, planar, sectional members to allow desired cover positioning over the at least one storage area, the cover being pivotally connected to the composite panel, the sectional members being pivotally connected to one another for folding one of the members over the other one of the members, each member having a top support surface;
    a substantially continuous carpet layer bonded to the top support surface of the panel and the top support surface of each of the members to at least partially form a carpeted load floor having a carpeted cover;

a first living hinge which allows the carpeted cover to pivot between different use positions including open and closed positions relative to the rest of the load floor; and a second living hinge which allows the members to pivot and fold one over the other in a folded, open position of the cover.

16. The load floor as claimed in claim 15, wherein a portion of the carpet layer not bonded to the panel or either of the members at least partially forms the first living hinge.

17. The load floor as claimed in claim 15, wherein a portion of the carpet layer not bonded to the panel or either of the members at least partially forms the second living hinge.

18. A carpeted, vehicle load floor including a pivotable cover segmented into articulated, sectional members, the load floor comprising:

a compression-molded, planar, composite panel having a reinforced thermoplastic first skin and a reinforced thermoplastic second skin and a core having a plurality of cavities and disposed between and bonded to the skins by press molding, the first skin having a top support surface;

a segmented, compression-molded, composite cover to removably cover at least one storage area in the interior of the vehicle, the cover being pivotally connected to the composite panel, the cover being segmented into articulated, planar, sectional members to allow desired cover positioning over the at least one storage area, the members being pivotally connected to one another for folding one of the members over the other one of the members, each member having a top support surface, one of the members comprising third and fourth reinforced thermoplastic skins and a core having a plurality of cavities and disposed between and bonded to the third and fourth skins by press molding;

a substantially continuous carpet layer bonded to the top support surface of the panel and the top support surface of each of the members to form a carpeted load floor having a carpeted cover;

a first living hinge which allows the carpeted cover to pivot between different use positions including open and closed positions relative to the rest of the load floor; and a second living hinge which allows the members to pivot and fold one over the other in a folded, open position of the cover.

19. The load floor as claimed in claim 18, wherein a portion of the carpet layer at least partially forms the first living hinge.

20. The load floor as claimed in claim 18, wherein a portion of the carpet layer at least partially forms the second living hinge.

* * * * *